(12) United States Patent
Kim

(10) Patent No.: US 11,689,650 B2
(45) Date of Patent: *Jun. 27, 2023

(54) CAMERA MODULE AND MOBILE PHONE USING THE SAME

(71) Applicant: LG INNOTEK CO., LTD., Seoul (KR)

(72) Inventor: Duhee Kim, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 64 days.

This patent is subject to a terminal disclaimer.

(21) Appl. No.: 17/363,989

(22) Filed: Jun. 30, 2021

(65) Prior Publication Data

US 2021/0329113 A1 Oct. 21, 2021

Related U.S. Application Data

(63) Continuation of application No. 16/584,258, filed on Sep. 26, 2019, now Pat. No. 11,082,546, which is a (Continued)

(30) Foreign Application Priority Data

Dec. 21, 2009 (KR) .......................... 10-2009-0128159

(51) Int. Cl.
*H04M 1/02* (2006.01)
*G02B 7/08* (2021.01)
(Continued)

(52) U.S. Cl.
CPC .......... *H04M 1/0264* (2013.01); *G02B 7/006* (2013.01); *G02B 7/08* (2013.01); *G02B 7/09* (2013.01);
(Continued)

(58) Field of Classification Search
CPC .. H04N 5/2254; H04N 5/2257; H04N 5/2253; H04N 5/2252; H04M 1/0264;
(Continued)

(56) References Cited

U.S. PATENT DOCUMENTS 5,844,719 A 12/1998 Wada
5,932,984 A 8/1999 Murakami et al.
(Continued)

FOREIGN PATENT DOCUMENTS

JP 2007-248964 A 9/2007
JP 2009-282090 A 12/2009
(Continued)

OTHER PUBLICATIONS

Office Action dated Dec. 20, 2011 in U.S. Appl. No. 12/974,674.
(Continued)

*Primary Examiner* — Pritham D Prabhakher
(74) *Attorney, Agent, or Firm* — Saliwanchik, Lloyd & Eisenschenk

(57) ABSTRACT

Disclosed herein is a camera module comprising: a circuit board; a frame coupled to the circuit board; an image sensor on the circuit board; a bobbin on the frame, a plurality of lenses being inside the bobbin; a coil wound on the bobbin, the bobbin moving to two directions based on a current applied to the coil; a magnet configured to interact the coil; and a yoke on the frame, the magnet being at an inner side of the yoke, wherein the bobbin moves to a first direction when a forward current is applied to the coil and to a second direction when a reverse current is applied to the coil.

20 Claims, 3 Drawing Sheets

Related U.S. Application Data continuation of application No. 15/418,076, filed on Jan. 27, 2017, now Pat. No. 10,469,717, which is a continuation of application No. 14/329,610, filed on Jul. 11, 2014, now Pat. No. 9,578,216, which is a continuation of application No. 13/974,622, filed on Aug. 23, 2013, now Pat. No. 8,792,938, which is a continuation of application No. 12/974,675, filed on Dec. 21, 2010, now Pat. No. 8,543,159.

(51) Int. Cl.
| | |
|---|---|
| G03B 3/10 | (2021.01) |
| G03B 5/00 | (2021.01) |
| H04N 1/00 | (2006.01) |
| H04N 23/51 | (2023.01) |
| H04N 23/54 | (2023.01) |
| H04N 23/55 | (2023.01) |
| H04N 23/57 | (2023.01) |
| G02B 7/00 | (2021.01) |
| G02B 7/09 | (2021.01) |
| G03B 13/36 | (2021.01) |
| G02B 5/20 | (2006.01) |

(52) U.S. Cl.
CPC ............ *G03B 3/10* (2013.01); *G03B 5/00* (2013.01); *G03B 13/36* (2013.01); *H04M 1/0266* (2013.01); *H04N 1/00307* (2013.01); *H04N 23/51* (2023.01); *H04N 23/54* (2023.01); *H04N 23/55* (2023.01); *H04N 23/57* (2023.01); *G02B 5/208* (2013.01); *G03B 2205/0007* (2013.01)

(58) Field of Classification Search
CPC .. H04M 1/00307; H04M 1/0266; G02B 7/09; G02B 7/006; G02B 5/208; G03B 13/36; G03B 3/10; G03B 2205/0007
USPC ........................................................ 348/357
See application file for complete search history.

(56) References Cited

U.S. PATENT DOCUMENTS

| | | | |
|---|---|---|---|
| 7,006,139 B2 | 2/2006 | Ohkawara | |
| 7,202,905 B2 | 4/2007 | Castaneda et al. | |
| 7,227,285 B2 | 6/2007 | Osaka | |
| 7,271,845 B2 | 9/2007 | Aoyama et al. | |
| 7,342,606 B2* | 3/2008 | Suh .......................... | G02B 7/10 396/85 |
| 7,463,436 B2 | 12/2008 | Takahashi et al. | |
| 7,468,753 B2 | 12/2008 | Butterworth et al. | |
| 7,565,070 B1 | 7/2009 | Gutierrez | |
| 7,638,906 B2 | 12/2009 | Liu et al. | |
| 7,719,601 B2 | 5/2010 | Horidan et al. | |
| 7,885,023 B2 | 2/2011 | Kim | |
| 7,932,648 B2 | 4/2011 | Jung | |
| 7,936,526 B2 | 5/2011 | Park et al. | |
| 8,107,006 B2 | 1/2012 | Sekimoto et al. | |
| 8,218,018 B2* | 7/2012 | Washisu ............... | G02B 27/646 348/208.99 |
| 8,390,725 B2 | 3/2013 | Sekimoto et al. | |
| 8,432,478 B2* | 4/2013 | Yano ...................... | G03B 17/04 396/75 |
| 8,543,159 B2 | 9/2013 | Kim | |
| 8,792,938 B2 | 7/2014 | Kim | |
| 10,698,173 B2 | 6/2020 | Park et al. | |
| 2004/0174614 A1* | 9/2004 | Hovanky ................. | G03B 3/10 359/694 |
| 2005/0134976 A1* | 6/2005 | Yano ........................ | G02B 7/08 359/824 |
| 2006/0216014 A1 | 9/2006 | Morinaga et al. | |
| 2007/0077061 A1* | 4/2007 | Watanabe .............. | H04N 23/55 396/493 |
| 2007/0086769 A1 | 4/2007 | Watanabe et al. | |
| 2007/0248344 A1 | 10/2007 | Santo et al. | |
| 2007/0263115 A1 | 11/2007 | Horidan et al. | |
| 2008/0055753 A1 | 3/2008 | Takahashi et al. | |
| 2008/0192124 A1 | 8/2008 | Nagasaki | |
| 2008/0198254 A1 | 8/2008 | Nagasaki | |
| 2008/0247063 A1* | 10/2008 | Otsuki ...................... | G02B 7/04 359/811 |
| 2008/0253003 A1* | 10/2008 | Shin ........................ | G02B 7/102 359/824 |
| 2009/0015948 A1* | 1/2009 | Wada ....................... | G02B 7/08 359/824 |
| 2009/0021635 A1 | 1/2009 | Cheng | |
| 2009/0059373 A1* | 3/2009 | Lam ........................ | G03B 13/36 359/557 |
| 2009/0161231 A1* | 6/2009 | Shiraki ................... | G02B 7/102 359/697 |
| 2009/0213264 A1 | 8/2009 | Kim | |
| 2009/0237815 A1 | 9/2009 | Kim | |
| 2009/0305695 A1 | 12/2009 | Bear et al. | |
| 2009/0316040 A1 | 12/2009 | Takatsuka et al. | |
| 2010/0039719 A1 | 2/2010 | Park et al. | |
| 2010/0053412 A1 | 3/2010 | Sekimoto et al. | |
| 2010/0079604 A1* | 4/2010 | Washisu ............... | H04N 23/673 359/557 |
| 2010/0110270 A1 | 5/2010 | Sekimoto et al. | |
| 2010/0134906 A1 | 6/2010 | Nakamura et al. | |
| 2010/0157143 A1 | 6/2010 | Kim et al. | |
| 2010/0158506 A1 | 6/2010 | Sekimoto et al. | |
| 2010/0182490 A1 | 7/2010 | Seol et al. | |
| 2011/0096421 A1* | 4/2011 | Hirata ..................... | F03G 7/065 310/307 |
| 2011/0226392 A1* | 9/2011 | Hirata ..................... | G02B 7/023 148/559 |
| 2013/0128108 A1 | 5/2013 | Oh et al. | |
| 2013/0235263 A1 | 9/2013 | Ryu | |

FOREIGN PATENT DOCUMENTS

| | | |
|---|---|---|
| KR | 20-0376032 Y1 | 11/2004 |
| KR | 10-2009-0004286 | 1/2009 |
| KR | 10-2011-0013966 A | 2/2011 |

OTHER PUBLICATIONS

Office Action dated Aug. 3, 2012 in U.S. Appl. No. 12/974,675.
Office Action dated Feb. 14, 2013 in U.S. Appl. No. 12/974,675.
Notice of Allowance dated May 24, 2013 in U.S. Appl. No. 12/974,675.
Office Action dated Dec. 10, 2013 in U.S. Appl. No. 13/974,622.
Notice of Allowance dated Mar. 24, 2014 in U.S. Appl. No. 13/974,622.
Office Action dated Jul. 2, 2015 in U.S. Appl. No. 14/329,610.
Office Action dated Jan. 12, 2016 in U.S. Appl. No. 14/329,610.
Office Action dated Jun. 29, 2016 in U.S. Appl. No. 14/329,610.
Notice of Allowance dated Oct. 5, 2016 in U.S. Appl. No. 14/329,610.
Office Action dated Jun. 22, 2018 in U.S. Appl. No. 15/418,076.
Office Action dated Nov. 23, 2018 in U.S. Appl. No. 15/418,076.
Notice of Allowance dated Jun. 26, 2019 in U.S. Appl. No. 15/418,076.
Office Action dated Oct. 23, 2020 in U.S. Appl. No. 16/584,258.
Notice of Allowance dated Mar. 31, 2021 in U.S. Appl. No. 16/584,258.

* cited by examiner

CAMERA MODULE AND MOBILE PHONE USING THE SAME

CROSS-REFERENCE TO RELATED APPLICATIONS

This application is continuation of U.S. application Ser. No. 16/584,258, filed Sep. 26, 2019; which is a continuation of U.S. application Ser. No. 15/418,076, filed Jan. 27, 2017, now U.S. Pat. No. 10,469,717, issued Nov. 5, 2019; which is a continuation of U.S. application Ser. No. 14/329,610, filed Jul. 11, 2014, now U.S. Pat. No. 9,578,216, issued Feb. 21, 2017; which is a continuation of U.S. application Ser. No. 13/974,622, filed Aug. 23, 2013, now U.S. Pat. No. 8,792,938, issued Jul. 29, 2014; which is a continuation of U.S. application Ser. No. 12/974,675, filed Dec. 21, 2010, now U.S. Pat. No. 8,543,159, issued Sep. 24, 2013; which claims the benefit under 35 U.S.C. § 119 of Korean Patent Application No. 10-2009-0128159, filed on Dec. 21, 2009; all of which are hereby incorporated by reference in their entirety.

BACKGROUND

Field of the Invention

The present invention relates to a mobile phone installed with a camera module.

Description of the Related Art

Concomitant with the development of recent communication and digital information processing technologies, a mobile phone technique integrated with information processing and computations, communications, and image information input/output has newly emerged.

Consistent with this, a mobile phone merged with a camera function has commercialized, at which system the mobile phone installed with a camera module photographs and stores moving images and still images and transfers them to the other party.

A mobile phone installed with such a camera module simply does not remain in a function of shooting an object, but is actually in a stage of adding an accessory function like a focus function of adjusting a focus of objects to be shot and a zoom function of making an object in the distance appear a near-sight or a close positioned object coming into a far distance.

A conventional lens unit of a camera module moves upward/downward along with an optical axis by a VCM (Voice Coil Motor), and through such an action, a camera module can do an auto focusing of a focal point of an object.

At this time, an upper part and a lower part of a lens unit is installed with an upper spring and an lower spring, and in a case a force applied to a lens part by a voice coil motor is greater than tension of a spring, a lens unit moves in an optical axis direction.

A camera module-installed mobile phone may operate in "vibration mode" vibrating by drive of a vibration motor, where a spring supporting a lens unit may rock simultaneously when a mobile phone is trembling due to a vibration mode.

When a spring supporting a lens unit rocks, so does a lens unit, whereby a banging sound occurs in a vibration mode as the lens unit touches a bottom surface.

BRIEF SUMMARY

The present invention provides a mobile phone installed with a camera module configured to inhibit a thud noise occurring due to a lens unit in a vibration mode of a mobile phone.

In one general aspect of the present invention, there may be provided a camera module, the camera module comprising: a circuit board; a frame coupled to the circuit board; an image sensor on the circuit board; a bobbin on the frame, a plurality of lenses being inside the bobbin; a coil wound on the bobbin, the bobbin moving to two directions based on a current applied to the coil; a magnet configured to interact the coil; and a yoke on the frame, the magnet being at an inner side of the yoke, wherein the bobbin moves to a first direction when a forward current is applied to the coil and to a second direction when a reverse current is applied to the coil.

In some exemplary of the present invention, the magnet may be between the yoke and the coil.

In some exemplary of the present invention, the first direction may include a direction distancing from the frame along an optical axis and the second direction may include a direction approaching the frame along the optical axis.

In some exemplary of the present invention, the camera module may further comprising: a first tension member at upper part of the bobbin; and a second tension member on the frame, wherein the second tension member is place below the bobbin.

In some exemplary of the present invention, outside part of the first tension member may be supported by an upper side of the yoke, and inside part of the first tension member may face the bobbin.

In some exemplary of the present invention, the either side of the second tension member may be spaced from the frame.

In some exemplary of the present invention, the second tension member may be isolated from the yoke.

In some exemplary of the present invention, the first tension frame may apply pressure to the upper part of the bobbin.

In some exemplary of the present invention, the camera module may further comprise a filter laid over the image sensor and below the bobbin, and configured to filter infrared inputted to the image sensor.

In some exemplary of the present invention, the camera module may further comprise a case supported by the frame.

In another general aspect of the present invention, there may be provided a mobile terminal comprising a camera module and a vibration control unit, wherein the camera module comprising; a circuit board; a frame coupled to the circuit board; an image sensor disposed on the circuit board; a bobbin on the frame, a plurality of lenses being inside the bobbin; a coil wound on the bobbin, the bobbin moving to two directions based on a current applied to the coil; a magnet configured to interact the coil; and a yoke disposed on the frame, the magnet being at an inner side of the yoke, and wherein the vibration control unit may be configured to output a first control signal and a second control signal when a signal for a vibration mode is inputted and a reverse current is applied to the coil according to the second control signal.

In some exemplary of the present invention, the mobile terminal may further comprise a vibration motor unit configured to vibrate the mobile terminal by driving a motor according to the first control signal from the vibration control unit.

In some exemplary of the present invention, the mobile terminal may further comprise an actuator drive unit configured to apply the reverse current to the coil according to the second control signal.

In some exemplary of the present invention, the yoke may comprise an upper plate and a lateral plate extended from an edge of the upper plate, and the magnet may be coupled to the lateral plate.

In some exemplary of the present invention, the frame may further comprise a supporter extended toward the image sensor from a peripheral portion of the frame.

An embodiment of the invention applies a reverse current to an actuator driving a lens unit of a camera module and thus extremely pushes a lens unit onto a tension member placed at a lower part, so that a banging sound occurring by movement of a lens unit in a vibration mode can be inhibited.

In addition, the present invention provides a mobile phone including, an actuator moving a lens; a vibration control unit outputting a first control signal and a second control signal; a vibration motor unit vibrating the mobile phone by driving a motor, when the first control signal is input, connected to the vibration control unit; and an actuator drive part applying the current to the actuator when the second control signal is input, connected to the vibration control unit.

DETAILED DESCRIPTION

Figure 1:
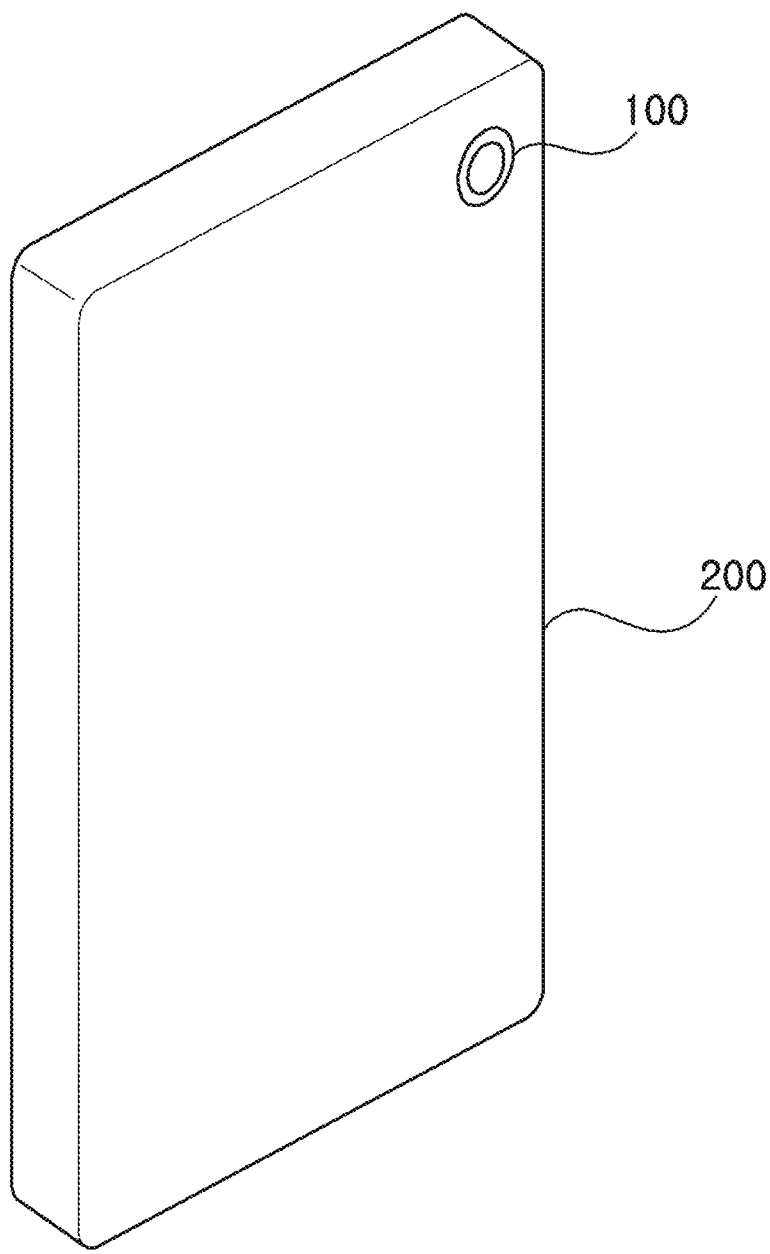
FIG. 1 is an outer shape diagram of a mobile phone according to an embodiment of the present invention.

Since the present invention can be applied with various changes thereto and several types of embodiments, specific embodiments intend to be exemplified in the drawings and minutely described in the detailed description. However, it should not be appreciated in a limiting sense of limiting the present invention to a specific example but to include all the changes, equivalents and replacements which fall in the spirit and technical scope of the present invention.

While terms including ordinal numbers such as a first and a second may be used to describe various components, such components are not limited to the terms. The terms are used only for the purpose of distinguishing one component from other components.

For example, a second component may be named as a first component without departing from the scope of the present invention rights, and in a similar way, the first component may be renamed as the second component.

Stated that any component is "connected" or "conjunctive" to another component, it will be appreciated to be directly connected or conjunctive to the very another component or otherwise that there exists any component in the midst of them. On the other hand, stating that any component is "directly connected" or "directly conjunctive" to another component, it should be understood that any other component does not exist therebetween.

Terms used in the present application are only used to describe a specific embodiment, not in a sense of limiting the invention. A singular form includes a plural form, otherwise stated in a different way in the context. In this application, the terms such as "include" or "have" indicate that there exist a characteristic, a number, a step, an operation, a component, other things recited in the specification or a combination thereof, but it should not be understood to preclude the existence or addition of one or more other characteristics, numbers, operations, substances, components or a combination of thereof.

In the following, a mobile phone according to an embodiment of the present invention will be described in detail referring to the attached drawings, but without regard to a drawing sign, an identical or corresponding component is assigned the same reference numeral and a redundant description regarding this will be omitted.

FIG. 1 is an outer shape diagram of a mobile phone according to the present invention.

As shown in FIG. 1, a mobile phone includes a main body 200 and a camera module 100 mounted at a setting position of the main body 200.

Figure 2:
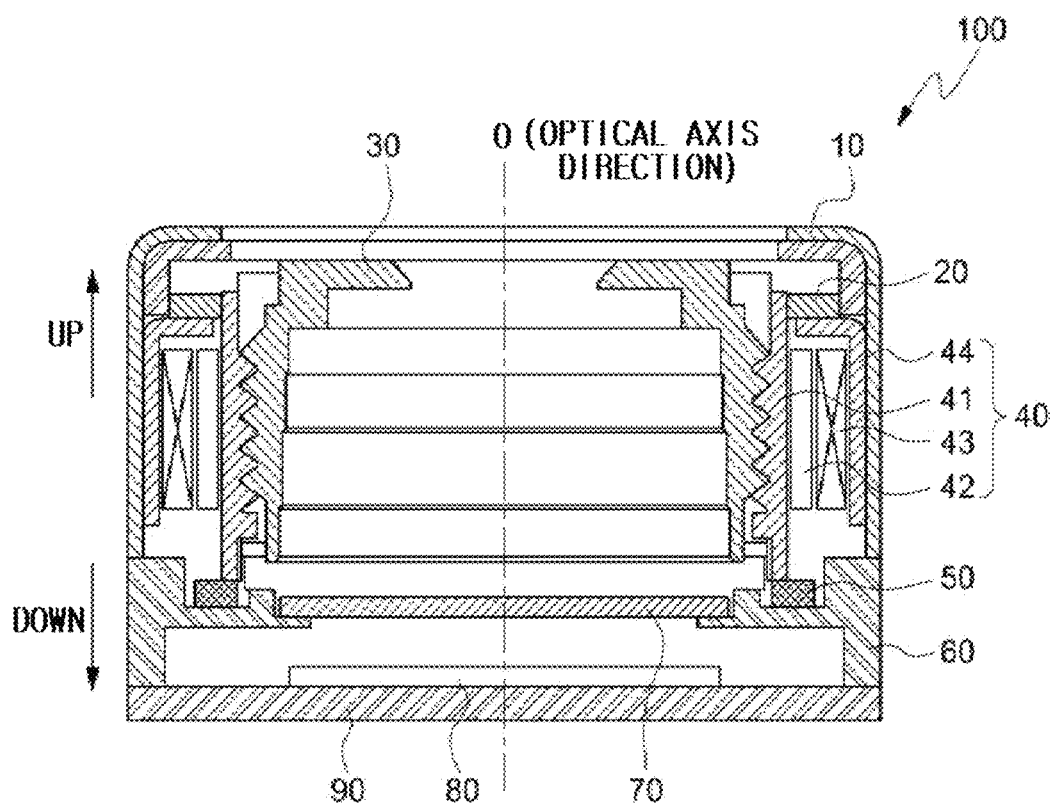
FIG. 2 is a cross-section view of a camera module according to an embodiment of the present invention.

FIG. 2 is a cross-sectional view of a camera module 100 according to an embodiment of the invention.

As shown in FIG. 2, a camera module 200 of the present invention includes a case 10, an upper part tension member 20, a lens barrel 30, an actuator 40, a lower part tension member 50, a frame 60, an IR filter 70, an image sensor 80 and a printed circuit board 90.

For auto focusing, an actuator 40, that is an operating unit shifting a lens barrel 30 along with an optical axis direction O, is necessary, in which the present invention is a voice coil motor among actuators 40.

An actuator 40 includes a bobbin 41, a coil 42, a permanent magnet 43, and a yoke 44.

A case 10 has a cubical form with its lower part opened, and an upper part central side is formed with a light penetration hole 11. A lower part of a case 10 is supported by a frame 60.

The case 10 is coupled with a frame 60 to form a frame 60, and the space includes an upper part tension member 20, a lens barrel 30, an actuator 40, and an IR filter 50.

It is preferred that a case 10 is manufactured with plastic for an insulation between its inner part and outer part, and an injection molding for mass production is possible.

An upper part tension member 20 is a plate spring, being inserted into an upper part of a case 10, and its outside part is supported by a yoke 44 of an actuator 40, and its inside part faces a bobbin 41 of an actuator 40 and applies pressure to an upper side of a bobbin 41.

A lower part tension member 50 may be into an insert injection at a bobbin 41, and may be pasted with a bond.

A lens barrel 30 is a means of fixing and protecting a plurality of lenses, an inner side of a lens barrel 30 is stacked with a plurality of lens capable of inputting a light image of a subject sequentially according to an optical axis direction O.

A surrounding surface of a lens barrel 30 is formed of a screw thread 31, and the screw thread 31 is screw-coupled to a screw thread formed at an inner-rim surface of a bobbin 41.

The bobbin 41 is of a cylindrical shape with its upper part and lower part opened, and the inner-rim surface is formed with a screw thread corresponding to a screw thread 31 of a lens barrel 30. The present invention may take the far distance focusing of a camera module by screw-coupling a lens barrel 30 to an inner-rim surface of a bobbin 41.

A surrounding part of a bobbin 41 is wound perpendicular to the direction of magnetic flux by a coil 42 interacting with a permanent magnet 43.

An inner side of a case 10 is inserted with a yoke 44 for keeping magnetic field between a coil 42 and a permanent magnet 43 from leaking from outside, and a permanent magnet 43 is mounted at an inner side of a yoke 44 to face each other based on a bobbin 41. The yoke 44 is supported by a frame 60.

When a voltage is applied to a coil 42, current flowing through the coil and magnetic field of a permanent magnet 43 interact (Fleming's left-hand rule), and thus a bobbin 41 is inflicted with a force towards an upper side of an optical axis direction. At this time, the greater the intensity of current applied to the coil 42 is, a distance a lens barrel 30 and a bobbin 41 shift to an upper part along an optical axis direction increases.

Successively, when a voltage applied to a coil 42 is blocked, a lens barrel 30 and a bobbin 41 shift to a lower part along with an optical axis direction by an upper part tension member 20 and a lower part tension member 50 and return to its original state.

A printed circuit board 90 is mounted with an image sensor 80 transforming a light image into an electrical signal, and a frame 60 is a rectangular shape having a central opening part that can penetrate a light to an image sensor 80, and the frame 60 is positioned at a lower part of a lens barrel 30, and mounted with an IR filter 70 filtering infrared.

An image sensor 80 is placed at a lower part of a lens barrel 30 and at an upper part of a printed circuit board 90, and transforms a light image incident through a plurality of lens into an electrical signal.

The printed circuit board 90 is an FPCB (Flexible Printed Circuit Board) having a high evenness level, an outwardly extended part from an FPCB is provided with means connected to an external device (not shown).

As described above, a lens barrel 30 of the present invention is supported by elasticity force between an upper part tension member 20 and a lower part tension member 50.

Figure 3:
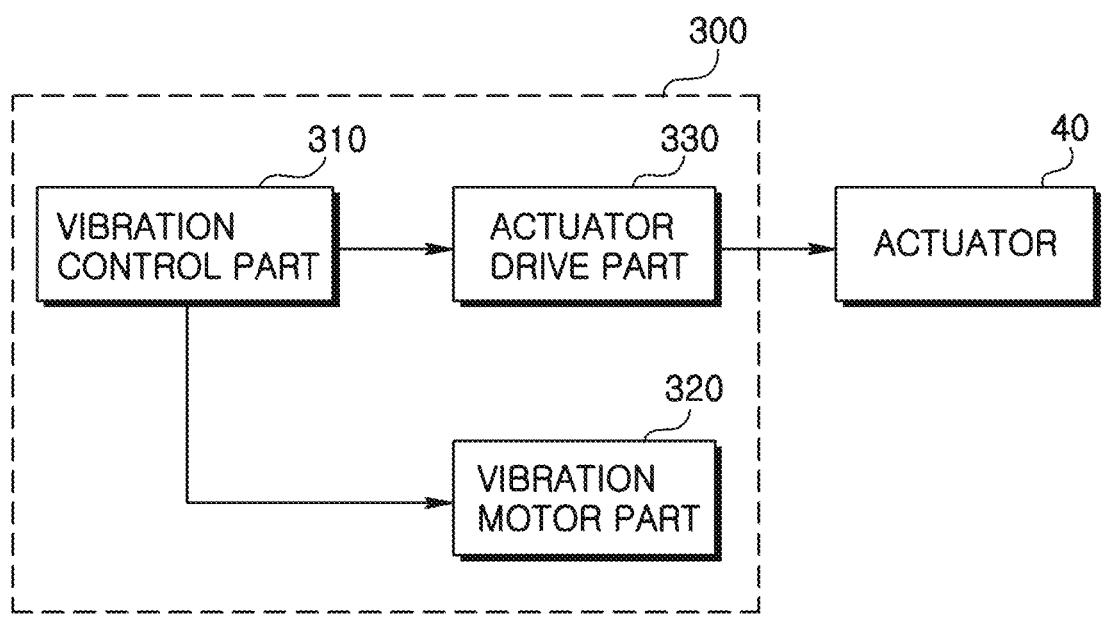
FIG. 3 is a schematic construction diagram of a central control unit and an actuator of a mobile phone according to an embodiment of the invention.

FIG. 3 is a schematic construction view of a central control part 300 and an actuator 40 of a mobile phone according to an embodiment of the invention.

As illustrated in FIG. 3, a central control part 300 of a mobile phone of the invention includes a vibration control part 310 controlling vibration of a mobile phone, a vibration motor part 320 receiving an electric source voltage according to a control signal of the vibration control part 310 and driving a mobile phone in a vibration mode, and an actuator drive part 330 driving the actuator 40 of a camera module.

The vibration control part 310 processes a signal input from an external and determines if a mobile phone should be operated in a vibration mode, and if a mobile phone needs to be operated in a vibration mode, outputs a first control signal to the vibration motor part 320.

Then, the vibration motor part 320 drives a motor so that a mobile phone vibrates according to a first control signal.

If a signal telling of operating in a vibration mode from outside is input like in the case of a vibration mode when a call is terminated or in a case a user manipulates a keypad to convert a bell mode into a vibration mode, a vibration control part 310 outputs a first control signal and a second control signal informing of a vibration mode initiation to a vibration motor part 320 and an actuator drive part 330, respectively.

An actuator drive part 330 applies "forward current" to the coil 42 of an actuator 40 at the time of auto focusing action, but if a second control signal from the vibration control part 310 is input, it applies "reverse current" to the coil 42 of an actuator 40.

If a reverse current is applied to the coil 42, a bobbin 41 of an actuator 40 is inflicted with a force toward a lower side of an optical axis direction by Fleming's left-hand rule. Then, a lens barrel 30 including a lens unit connected to a bobbin 41 is maximally pushed to a lower part tension member 50, thereby presumably inhibiting a banging sound occurring according to the falter of a lens unit in a vibration mode of a mobile phone.

A circuit of applying a forward current and a reverse current to the actuator 40 may be variously realized, and a related specific description will be omitted.

The vibration control part 310 may output simultaneously a first control signal and a second control signal, but it may output a first control signal a pre-defined time after a second control signal is outputted.

A vibration control part 310 of the present invention may set a certain time interval while a second control signal is output and afterwards a first control signal is output, so that a vibration mode after a lens barrel 30 is maximally pushed to a lower part tension member 50 may be initiated and a banging sound occurring according to the falter of a lens unit may be inhibited.

At this time, a certain time interval is a time required so that a lens barrel 30 closely couples to a lower part tension member 50.

While the present invention has been described in detail through representative embodiments in the above part, those skilled in the art would understand that various modifications can be made in the described embodiment without departing from the scope of the present invention.

What is claimed is:

1. A camera module comprising:
   a printed circuit board;
   an image sensor disposed on the printed circuit board;
   a frame disposed above the printed circuit board;
   a filter disposed on the frame;
   a yoke comprising an upper plate and a lateral plate extending from the upper plate;
   a bobbin disposed in the yoke;
   a lens barrel coupled to the bobbin;
   a lens coupled to the lens barrel and overlapped with the image sensor in an optical axis direction;
   a coil disposed on the bobbin;
   a magnet disposed between the coil and the lateral plate of the yoke; and
   an elastic member coupled to the bobbin,
   wherein the bobbin moves in a first direction when a forward current is applied to the coil,
   wherein the bobbin moves in a second direction opposite to the first direction when a reverse current is applied to the coil,
   wherein the bobbin comprises a first screw thread formed on an inner lateral surface of the bobbin, and
   wherein the lens barrel comprises a second screw thread formed on an outer lateral surface of the lens barrel and coupled with the first screw thread.

2. The camera module of claim 1, wherein the filter comprises an IR filter filtering infrared light.

3. The camera module of claim 1, wherein the filter is disposed on an upper surface of the frame.

4. The camera module of claim 3, wherein the frame comprises a protruding part protruding from the upper surface of the frame,
   wherein the IR filter is disposed in the protruding part, and
   wherein the protruding part comprises an inner lateral surface directly facing an outer lateral surface of the filter.

5. The camera module of claim 1, wherein the lens comprises a plurality of lenses,
wherein the lens barrel comprises a plurality of lens spaces accommodating the plurality of lenses, respectively,
wherein the plurality of lens spaces comprises a first lens space disposed farthest from the filter between the plurality of lens spaces, and
wherein a width of the filter is greater than a width of the first lens space in a direction perpendicular to the optical axis direction.

6. The camera module of claim 1, wherein the first screw thread comprises an inclined plane connected to the inner lateral surface of the bobbin to form an obtuse angle.

7. The camera module of claim 1, wherein the lens barrel comprises a slanted surface formed on the outer lateral surface of the lens barrel and disposed above the second screw thread, and
wherein a space is formed between the slanted surface of the lens barrel and the inner lateral surface of the bobbin.

8. The camera module of claim 1, wherein an inner diameter of the second screw thread of the lens barrel is greater than a diameter of the outer lateral surface of the lens barrel.

9. The camera module of claim 1, wherein the lens barrel comprises a stepped part recessed inwardly from the outer lateral surface of the lens barrel between the second screw thread and an upper end of the lens barrel.

10. The camera module of claim 1, wherein an extension part is formed on the inner lateral surface of the bobbin at a lower side of the first screw thread, and
wherein the extension part has an inner diameter corresponding to an inner diameter of the first screw thread and a shape different from a shape of the first screw thread.

11. The camera module of claim 1, wherein the frame comprises an upper surface facing a lower surface of the bobbin,
wherein the upper surface of the frame comprises a first area overlapped with a lower end of the bobbin in an optical axis direction and a protrusion upwardly more protruding than the first area and disposed outside the first area, and
wherein an upper surface of the protrusion of the frame is lower than an upper surface of the bobbin.

12. The camera module of claim 1, wherein the lens barrel comprises an upper part disposed above the lens and comprises a hole,
wherein an inner peripheral surface of the upper part of the lens barrel comprises a slanted surface, and
wherein the slanted surface of the lens barrel is connected to an upper surface of the lens barrel to form an obtuse angle.

13. The camera module of claim 1, wherein the elastic member comprises a first plate spring and a second plate spring disposed below the first plate spring, and
wherein an outer part of the first plate spring is supported by an upper surface of the yoke, and an inner part of the first plate spring is coupled with the bobbin.

14. A mobile terminal comprising the camera module of claim 1 and a control part,
wherein the control part controls the forward current or the reverse current applied to the coil.

15. The mobile terminal of claim 14, wherein the control part comprises:

a vibration control part outputting a first control signal for vibrating the mobile terminal and a second control signal for driving an actuator;
a vibration motor part vibrating the mobile terminal by driving a motor in response to the first control signal; and
an actuator drive part driving the actuator in response to the second control signal,
wherein the actuator is formed by the bobbin, the coil, the magnet, and the yoke,
wherein the actuator is disposed in the camera module and configured to perform an auto focusing function by applying the forward current to the coil and to perform moving the bobbin and the lens toward frame in the optical axis direction by applying the reverse current to the coil in response to the second control signal, and
wherein the vibration control unit outputs the first control signal after the second control signal is output.

16. A camera module comprising:
a printed circuit board;
an image sensor disposed on the printed circuit board;
a frame disposed on the printed circuit board;
a filter disposed on the frame;
a yoke comprising an upper plate and a lateral plate extending from the upper plate;
a bobbin disposed in the yoke;
a lens barrel coupled to the bobbin;
a lens coupled to the lens barrel and overlapped with the image sensor in an optical axis direction;
a coil disposed on the bobbin;
a magnet disposed between the coil and the lateral plate of the yoke; and
an elastic member coupled to the bobbin,
wherein the lens moves toward the filter when a reverse current is applied to the coil,
wherein the frame comprises an upper surface facing a lower surface of the bobbin,
wherein the upper surface of the frame comprises a first area overlapped with a lower end of the bobbin in an optical axis direction and a protrusion upwardly more protruding than the first area and disposed outside the first area, and
wherein an upper surface of the protrusion of the frame is lower than an upper surface of the bobbin.

17. The camera module of claim 16, wherein the filter comprises an IR filter filtering infrared light.

18. The camera module of claim 16, wherein the filter is disposed on an upper surface of the frame,
wherein the frame comprises a protruding part protruding from the upper surface of the frame,
wherein the IR filter is disposed in the protruding part, and
wherein the protruding part comprises an inner lateral surface directly facing an outer lateral surface of the filter.

19. The camera module of claim 16, wherein the lens comprises a plurality of lenses,
wherein the lens barrel comprises a plurality of lens spaces accommodating the plurality of lenses, respectively,
wherein the plurality of lens spaces comprises a first lens space disposed farthest from the filter between the plurality of lens spaces, and
wherein a width of the filter is greater than a width of the first lens space in a direction perpendicular to the optical axis direction.

20. A camera module comprising:
a printed circuit board;

an image sensor disposed on the printed circuit board;
a frame disposed above the printed circuit board;
a filter disposed on the frame;
a yoke comprising an upper plate and a lateral plate extending from the upper plate;
a bobbin disposed in the yoke;
a lens barrel coupled to the bobbin;
a lens coupled to the lens barrel and overlapped with the image sensor in an optical axis direction;
a coil disposed on the bobbin;
a magnet disposed between the coil and the lateral plate of the yoke; and
an elastic member coupled to the bobbin,
wherein the bobbin moves in a first direction when a forward current is applied to the coil,
wherein the bobbin moves in a second direction opposite to the first direction when a reverse current is applied to the coil,
wherein the elastic member comprises a first plate spring and a second plate spring disposed below the first plate spring, and
wherein an outer part of the first plate spring is supported by an upper surface of the yoke, and an inner part of the first plate spring is coupled with the bobbin.

* * * * *